United States Patent
Sprick

[19]

[11] Patent Number: 6,101,761
[45] Date of Patent: Aug. 15, 2000

[54] RODENT SPRING TRAP

[76] Inventor: Kenneth F. Sprick, R.R. 1, Box 25, Zumbro Falls, Minn. 55991

[21] Appl. No.: 09/227,123

[22] Filed: Jan. 7, 1999

[51] Int. Cl.[7] .................................................. A01M 23/26
[52] U.S. Cl. ........................................ 43/88; 43/85; 43/90
[58] Field of Search .................................. 43/77, 78, 79, 43/80, 85, 88, 90

[56] References Cited

U.S. PATENT DOCUMENTS

| | | | |
|---|---|---|---|
| 615,851 | 12/1898 | Hooker | 43/88 |
| 622,700 | 4/1899 | Mackintosh | 43/88 |
| 1,184,667 | 5/1916 | Appleby | 43/88 |
| 1,385,024 | 7/1921 | Russell | 43/88 |
| 1,479,853 | 1/1924 | Gambee | 43/88 |
| 1,485,746 | 3/1924 | Ward | 43/88 |
| 1,557,043 | 10/1925 | Graham | 43/88 |
| 1,729,976 | 10/1929 | Wyman | 43/88 |
| 1,764,225 | 6/1930 | Raymond | 43/90 |
| 1,830,675 | 11/1931 | Raymond | 43/90 |
| 2,446,078 | 7/1948 | Churchill | 43/85 |
| 4,161,842 | 7/1979 | Jacob | 43/85 |
| 4,733,494 | 3/1988 | Johnson | 43/85 |
| 5,307,587 | 5/1994 | Zeiger | 43/88 |

OTHER PUBLICATIONS

Nash Products, Inc., informational pamphlet, including excerpts, from an article by Dr. Paul Scott, "Organic Gardening" magazine, Jul., 1949.

P–W MFG. CO., Gopher and Mole Trap instructional pamphlet, pp. 1–4.

*Primary Examiner*—Kurt Rowan
*Attorney, Agent, or Firm*—Gerald E. Helget; Rider, Bennett, Egan & Arundel

[57] ABSTRACT

A trap for rodents, moles, or other burrowing animals, comprising: a handle; two pairs of opposed legs rotatably mounted on the handle; a spring biasing each pair of opposed legs in a sprung position wherein the two legs of each pair of opposed legs are adjacent one another; means for rotating the two pairs of opposed legs about the handle to a set position wherein the two legs of each pair of opposed legs are separated from one another, thereby forming a passage for the animal; a latch for holding the two pairs of opposed legs in the open position; and a trigger for releasing the latch, whereby the two pairs of opposed legs will snap rapidly to the sprung position, thereby trapping and killing the animal.

17 Claims, 2 Drawing Sheets

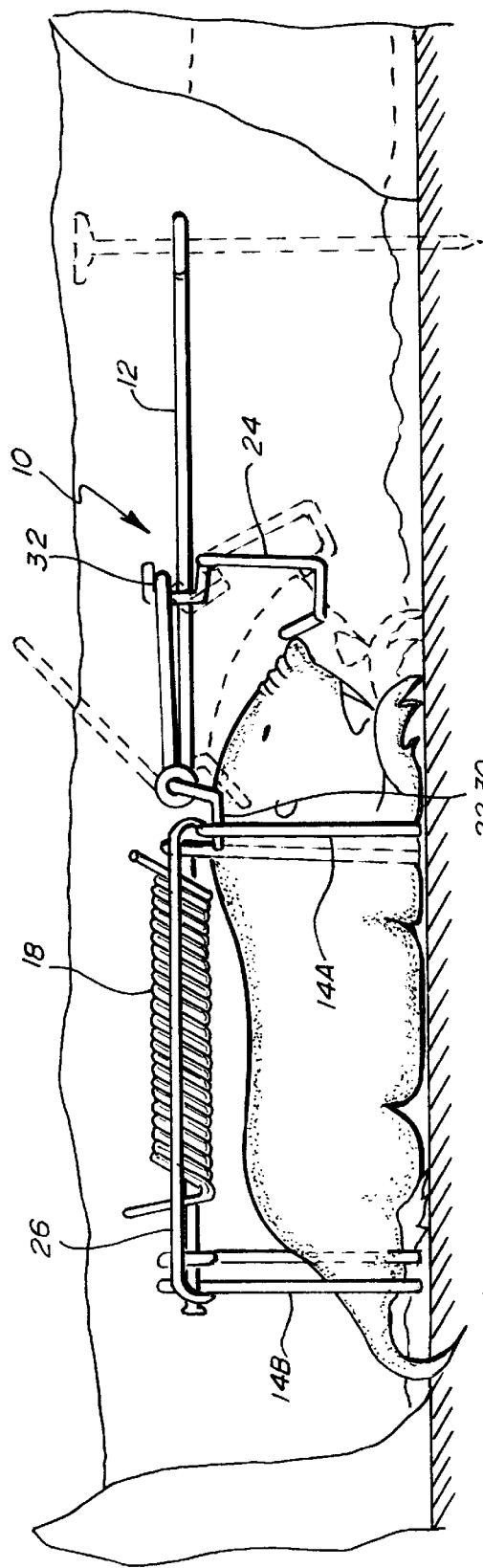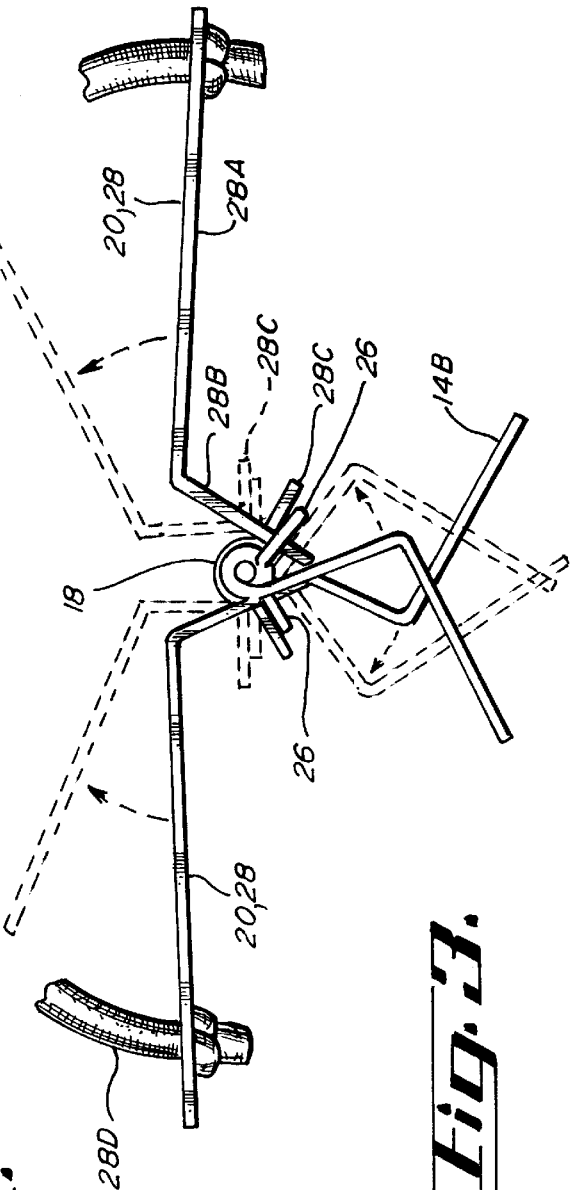
Fig. 1.
Fig. 3.

RODENT SPRING TRAP

BACKGROUND OF THE INVENTION

The present invention relates to an improved spring trap for burrowing animals such as rodents, gophers and moles.

A pair or moles produce four young each year. The young are seldom observed until they are practically full grown. In the middle western states the young are born in April, and are fed in the nest until sometime in June. When the young begin to run in June, a sharp increase in the number of runways will be observed. The burrows are from one and one-half to two incites in diameter, and are feed lines. Into these burrows crawl the earthworms and insects which are eaten by the moles. As a rule there is one family of moles for each set of runways and feed lines. In times of food scarcity, the runways of one family may be invaded by moles from a different family.

Moles are kept out of the greens of golf courses by killing the soil organisms. This is accomplished by applying strong mixtures of lead arsenate or ammonium sulphate. However, it is not practical or even legal in most areas for homeowners to apply such strong chemicals to their lawns and gardens.

The surest way to eliminate moles is to destroy them. In the past, this has been done by a device known as a choker loop trap. Other types of mole traps have been devised but none is as efficient as the choker loop type. The trap will work in lawns, vegetable gardens, and in any kind of soil. In setting the choker loop trap, less attention need be given to conditioning the soil. The loops may be forced into the ground with the certainty that they well react promptly when the trap is sprung. Traps of this type will also stand up to the work better than any other type in heavy clay or gravel soils.

Nevertheless, there were problems with previous choker loop traps. Earlier traps were difficult aid dangerous to set, with a real possibility of the fingers or hands being pinched by the loops. The triggers and latches often had complex interaction with the spring and other parts of the trap. Often there was only one pair of loops in the trap, allowing the possibility of the animal avoiding the loops or escaping from the trap, or of not being killed instantaneously and therefore undergoing unnecessary suffering.

There is a need for an improved rodent or mole trap that overcomes previous deficiencies with choker loop type traps.

SUMMARY OF THE INVENTION

A trap for rodents, moles, or other burrowing animals, comprising: a handle; two pairs of opposed legs rotatably mounted on the handle; a spring biasing each pair of opposed legs in a sprung position wherein the two legs of each pair of opposed legs are adjacent one another; means for rotating the two pairs of opposed legs about the handle to a set position wherein the two legs of each pair of opposed legs are separated from one another, thereby forming a passage for the animal; a latch for holding the two pairs of opposed legs in the open position; and a trigger for releasing the latch, whereby the two pairs of opposed legs will snap rapidly to the sprung position, thereby trapping and killing the animal.

A principal object and advantage of the present invention is that it can be set very easily.

Another principal object and advantage of the present invention is that it provides a robust mechanism to set the trap that prevents accidental injury to the fingers and hands.

Another object and advantage of the present invention is that it provides two sets of choking legs, eliminating the possibility of the animal avoiding the trap or escaping from it.

Another object and advantage of the present invention is that it kills the animal very quickly, avoiding needless suffering.

BRIEF DESCRIPTION OF THE DRAWINGS

FIG. 1 is a side elevational view of the set trap in place in an underground runway, with an animal about to spring the trap.

FIG. 3 is a cross-section of the trap showing the motion of the legs during the setting process.

DETAILED DESCRIPTION OF THE PREFERRED EMBODIMENTS

Figure 4:
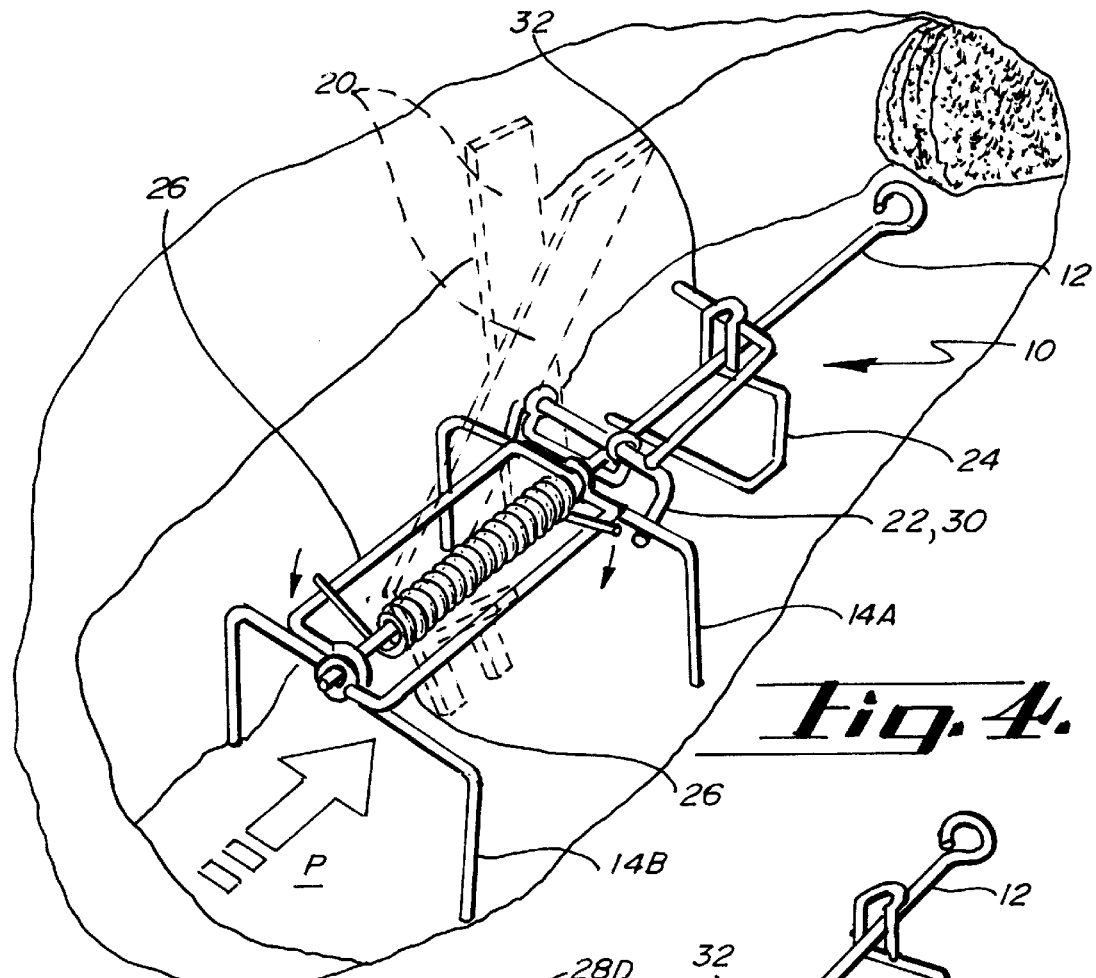
FIG. 4 is a perspective view of the trap in the set position in an underground runway. The handles are shown in dashed lines to indicate their new position.

The rodent trap of the present invention is generally shown in the Figures as reference numeral 10.

FIG. 1 shows the rodent trap 10 set and in place in an underground runway with an animal about to spring the trap 10.

The trap 10 comprises a handle 12 which can be used for placing the trap 10 into a runway and removing the trap 10 from the runway.

Figure 2:
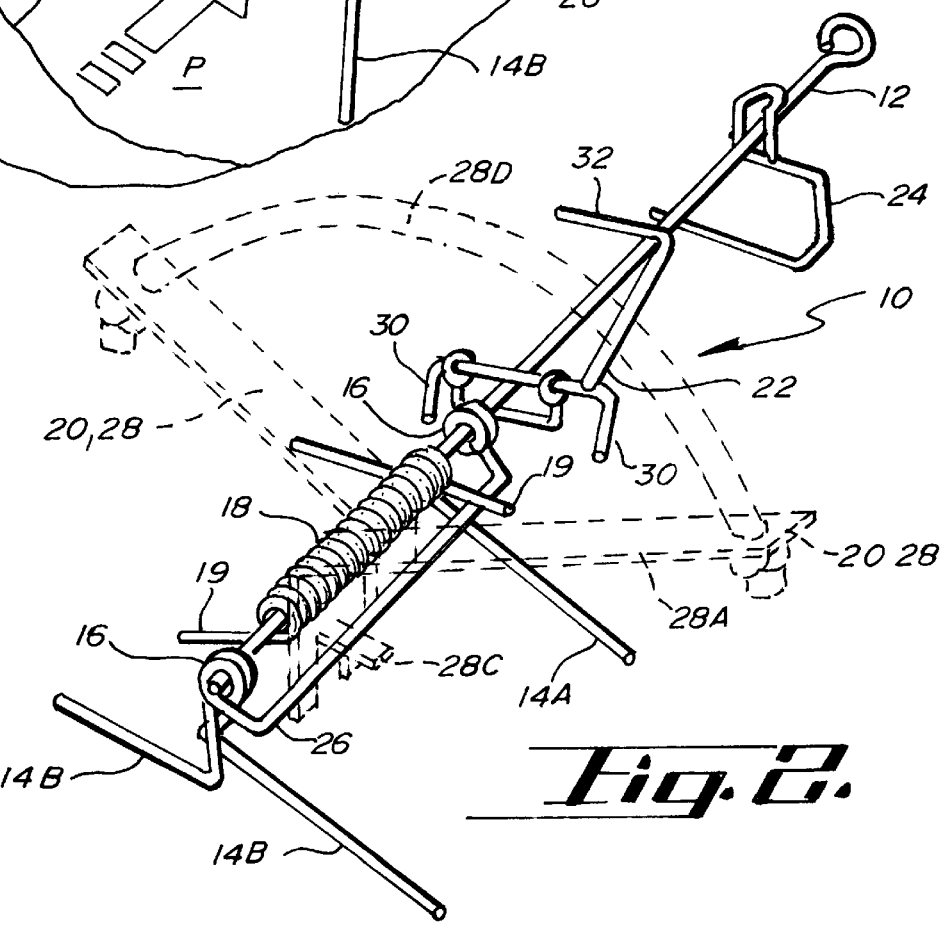
FIG. 2 is a perspective view of the trap in its position before being set. The handles are shown in dashed lines to indicate being put on the trap.

The trap 10 further comprises two pairs 14A, 14B of opposed legs 14 rotatably mounted on the handle 12. As best seen in FIG. 2, each pair of legs 14A, 14B preferably has a loop 16 which encircles the handle for rotation.

The trap 10 further comprises a spring 18 biasing each pair 14A, 14B of legs in a sprung position (FIG. 2) wherein the two legs of each pair 14A, 14B are adjacent to each other.

The trap 10 further comprises a means 20 for rotating the two leg pairs 14A, 14B about the handle 12 to a set position (FIG. 4) in which the two legs of each pair are separated from one another, thereby forming a passage P for the animal.

The trap 10 further comprises a latch 22 for holding the two legs of each pair 14A, 14B in the set position.

The trap 10 further comprises a trigger 24 for releasing the latch 22, whereby the two pairs of legs 14A, 14B will snap rapidly to the sprung position, thereby trapping and killing the animal.

Further construction detail of the trap 10 is as follows.

The trap 10 also preferably includes a pair of latching bars 26 interconnecting two legs of the pairs 14A, 14B on each side of the handle 12. The spring 18 is engaged between the two latching bars in a standard way, with one ear 19 of the spring 18 tensioned against each of the latching bars 26.

In the preferred embodiment, the means 20 for rotating the two pairs of opposed legs further comprises a pair of latching handles 28 engaging the latching bars 26, the latching handles rotating the latching bars 26 about the handle 12, simultaneously spreading the legs 14A, 14B and tensioning the spring 18. As can be seen in FIG. 3, movement of the latching handles 28 in an upward direction causes the legs 14A, 14B to move apart from one another as the latching bars 26 rotate about the handle 12. Preferably, the latching handles 28 comprise an elongate member 28A, a tab 28B at one end of the elongate member and insertable between the latching bar 26 and the spring 18, and a stop 28C for limiting the distance of insertion of the tab 28B. The trap 10 may also have a safety connector 28D interconnecting the latching handles 28 to prevent the latching handles 28 from hitting the operator if accidentally released.

FIG. 4 shows the set trap. As can be seen, the latch 22 preferably comprises a pair of latching studs 30 engaging the legs 14A and a trigger stud 32 engaging the trigger 24. It will be clear from the Figures how the latching studs 30 exert upward pressure against the legs 14A, against the tension of the spring 18, and the trigger 24 prevents the spring from forcing the latching studs 30 away from engagement with the legs 14A.

As can be seen by comparing FIG. 2 with FIG. 4, the latch 22 and the trigger 24 are movable along the handle 12. They therefore do not interfere with the motion of the latching handles 28.

The legs 14A, 14B comprise two sections formed at a substantially right angle as shown, whereby in the set position (FIG. 4) the legs form a rectangular passage P for the animal and whereby in the sprung position (FIG. 2) the animal (not shown) is trapped between the legs at the intersection of the two leg sections.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A trap for rodents, moles, or other burrowing animals, the trap comprising:
   (a) a handle;
   (b) two pairs of opposed legs rotatably mounted on the handle;
   (c) a spring mounted on the handle for biasing each pair of opposed legs in a sprung position wherein the two legs of each pair of opposed legs are adjacent one another;
   (d) means for rotating the two pairs of opposed legs about the handle to a set position wherein the two legs of each pair of opposed legs are separated from one another, thereby forming a passage for the animal;
   (e) a latch movably mounted on the handle for holding the two pairs of opposed legs in the set position; and
   (f) a trigger movably mounted on the handle and the latch being mounted between the spring and trigger the trigger being adapted for releasing the latch, whereby the two pairs of opposed legs will snap rapidly to the sprung position, thereby trapping and killing the animal.

2. The trap of claim 1, further comprising a pair of latching bars interconnecting two legs on each side of the handle, the spring being engaged between the two latching bars.

3. The trap of claim 2, wherein the means for rotating further comprises a pair of latching handles engaging the latching bars and the latching handles rotating the latching bars about the handle, simultaneously spreading the opposed legs apart and tensioning the spring.

4. The trap of claim 3, wherein the latching handles further comprise an elongate member, a tab formed at one end of the elongate member and insertable between the latching bar and the spring, and a stop for limiting the distance of insertion of the tab.

5. The trap of claim 3, further comprising a safety connector interconnecting the latching handles and preventing the latching handles from hitting the operator if accidentally released.

6. The trap of claim 1, wherein the latch further comprises a pair of latching studs engaging the legs and a trigger stud engaging the trigger.

7. The trap of claim 6, wherein both the latch and the trigger are movable along the handle.

8. The trap of claim 1, wherein each of the legs comprises two sections formed at substantially a right angle, whereby in the set position the legs form a rectangular passage for the animal and whereby in the sprung position the animal is trapped between the legs at the intersection of the two leg sections.

9. A trap for rodents, moles, or other burrowing animals, the trap comprising:
   (a) a handle;
   (b) two pairs of opposed legs rotatably mounted on the handle;
   (c) a spring biasing each pair of opposed legs in a sprung position wherein the two legs of each pair of opposed legs are adjacent one another;
   (d) a pair of latching handles for rotating the two pairs of opposed legs about the handle to a set position wherein the two legs of each pair of opposed legs are separated from one another, thereby forming a passage for the animal;
   (e) a pair of latching bars interconnecting two legs on each side of the handle, the spring being engaged between the two latching bars, the latching handles engaging the latching bars, and the latching handles rotating the latching bars about the handle, simultaneously spreading the opposed legs apart and tensioning the spring, wherein the latching handles further comprise an elongate member, a tab formed at one end of the elongate member and insertable between the latching bar and the spring, and a stop for limiting the distance of insertion of the tab;
   (f) a latch for holding the two pairs of opposed legs in the set position wherein the latch further comprises a pair of latching studs engaging the latching bars; and
   (g) a trigger for releasing the latch, whereby the two pairs of opposed legs will snap rapidly to the sprung position, thereby trapping and killing the animal.

10. The trap of claim 9, further comprising a safety connector interconnecting the latching handles and preventing the latching handles from hitting the operator if accidentally released.

11. The trap of claim 9, wherein both the latch and the trigger are movable along the handle.

12. The trap of claim 9, wherein each of the legs comprises two sections formed at substantially a right angle, whereby in the set position the legs form a rectangular passage for the animal and whereby in the sprung position the animal is trapped between the legs at the intersection of the two leg sections.

13. A trap for rodents, moles, or other burrowing animals, the trap comprising:
   (a) an elongate handle for gripping the trap;
   (b) two pairs of opposed legs rotatably mounted on the handle;
   (c) a spring mounted on the handle biasing each pair of opposed legs in a sprung position wherein the two legs of each pair of opposed legs are adjacent one another;
   (d) means for rotating the two pairs of opposed legs about the handle to a set position wherein the two legs of each pair of opposed legs are separated from one another, thereby forming a passage for the animal;

(e) a pair of latching bars interconnecting two legs on each side of the handle, the spring being engaged between the two latching bars;

(f) a latch movably mounted on the handle for holding the two pairs of opposed legs in the set position wherein the latch further comprises a pair of latching studs engaging the latching bars; and (g) a trigger releasably connectable to the latch for releasing the latch, whereby the two pairs of opposed legs will snap rapidly to the sprung position, thereby trapping and killing the animal.

14. The trap of claim 13, wherein the means for rotating further comprises a pair of latching handles engaging the latching bars and the latching handles rotating the latching bars about the handle, simultaneously spreading the opposed legs apart and tensioning the spring, and wherein the latching handles further comprise an elongate member, a tab formed at one end of the elongate member and insertable between the latching bar and the spring, and a stop for limiting the distance of insertion of the tab.

15. The trap of claim 13, further comprising a safety connector interconnecting the latching handles and preventing the latching handles from hitting the operator if accidentally released.

16. The trap of claim 13, wherein both the latch and the trigger are movable along the handle.

17. The trap of claim 13, wherein each of the legs comprises two sections formed at substantially a right angle, whereby in the set position the legs form a rectangular passage for the animal and whereby in the sprung position the animal is trapped between the legs at the intersection of the two leg sections.

* * * * *